(No Model.)

C. W. MILES.
AIR OR GAS COMPRESSOR.

No. 531,552. Patented Dec. 25, 1894.

Witnesses
O. Kaiser
T. Simmons

Inventor
Casper W. Miles
By Wood & Boyd
Attorneys

UNITED STATES PATENT OFFICE.

CASPER W. MILES, OF CINCINNATI, OHIO.

AIR OR GAS COMPRESSOR.

SPECIFICATION forming part of Letters Patent No. 531,552, dated December 25, 1894.

Application filed May 15, 1893. Serial No. 474,330. (No model.)

*To all whom it may concern:*

Be it known that I, CASPER W. MILES, a citizen of the United States, residing at Cincinnati, in the county of Hamilton and State of Ohio, have invented certain new and useful Improvements in Air or Gas Compressors, of which the following is a specification.

My invention relates to improvements in air and gas compressors, and is especially designed for use as an ice or refrigerating machine. Its object is to provide a new and improved double acting compressor pump having the advantages of a single acting pump, and thus avoiding the necessity for double cylinders and operative parts, all of which will be fully explained in the description of the accompanying drawings, making a part of this specification, in which—

Figure 1:
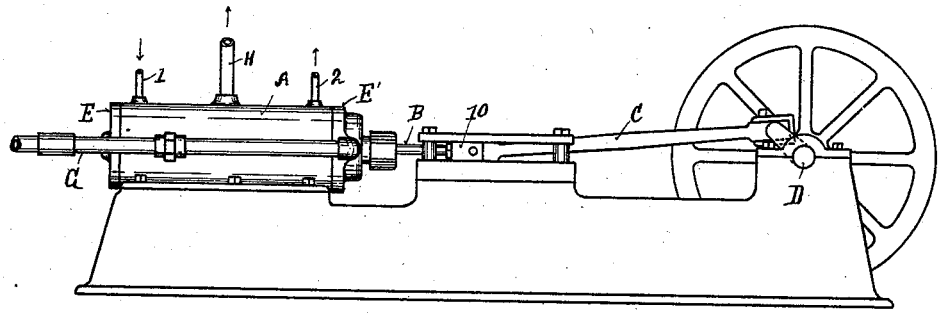
Figure 2:
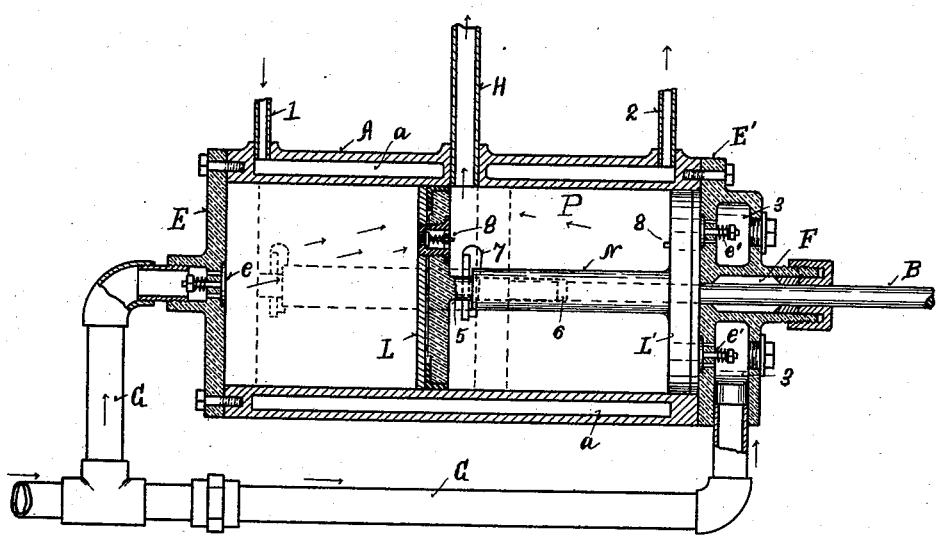
Figure 3:
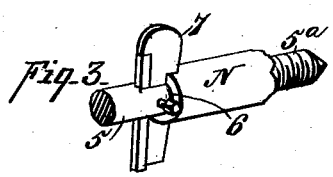

Figure 1 is a side elevation of my improved compressor. Fig. 2 is a diagram showing the compressor cylinder in central vertical section, and Fig. 3 is a detail view to illustrate the construction whereby the two pistons can be adjusted toward or from each other.

A represents the cylinder; B, the piston rod; C, the pitman, and D the crank shaft. The cylinder A is provided with a water jacket *a* which encircles the cylinder for the purpose of cooling the same.

1 represents the water supply pipe, and 2 represents the waste pipe.

E E' represent the cylinder heads which are each provided with gas intake valves *e*, *e'*.

G represents the gas supply pipes tapping the chambers of the valves *e*, *e'*, and H the gas discharge pipe tapping the cylinder centrally between the ends of the cylinder in such manner that the discharge pipe is constantly in communication with the cylinder between the two connected pistons hereinafter described.

F represents the stuffing box through which the piston rod passes.

3 represents a chamber cored in the head E' and encircling the stuffing box, which is thereby kept cool by the cool gas passing into the cylinder.

L L' represent pistons which are mounted on rod B and reciprocate respectively in opposite ends of the cylinder. Thus the piston L reciprocates to and from the head E in one end of the cylinder, while the piston L' reciprocates to and from the head E' in the opposite end of the cylinder.

In Fig. 2 the full lines represent the forward position of the pistons while the dotted lines represent the reverse position. The piston L' is rigidly secured to the piston rod while the piston L is adjustably secured to the shank N projecting from the piston L'.

5 represents the stem of piston L which is screw threaded as at $5^a$, Fig. 3, and enters a screw threaded socket 6 in the shank N.

7 represents a key passing through a slot in the stem 5 and engaging the shank N to lock the parts in position when the proper adjustment is obtained.

8 represents outlet valves located one or more in each of the pistons L, L'.

Mode of operation: The piston L' is first accurately adjusted to the head E' by the adjustment of the piston rod in the cross head 10. The piston L is then adjusted to or from piston L' until on its return stroke it comes close to the head E. The cylinder heads are then secured in place and the pump started. Gas is alternately taken in at opposite ends of the cylinder through valves *e*, *e'* and upon the return stroke of the pistons is forced through the outlet valves 8 into the space P between the pistons from whence the gas is conveyed by pipe H to a condenser or place where it is to be utilized.

Having described my invention, what I claim is—

1. The combination in an air or gas compressor, of a cylinder A provided with inlet valves *e* and *e'* at its opposite ends, a pair of connected pistons movable in the cylinder and provided with outlet valves 8, a piston-rod extending through one end of the cylinder and connected with one of the pistons, an outlet pipe H opening through the cylinder and communicating therewith between the said pistons, and a supply-pipe G connected with and supplying the air or gas to the opposite ends of the cylinder through said inlet valves, substantially as described.

2. The combination in an air or gas compressor, of a cylinder A having at one end an inlet valve *e* and at the opposite end a stuffing-box F, a cooling chamber 3 surrounding the stuffing-box, an inlet valve *e'* controlling communication between the interior of the cylinder and the said cooling chamber, two connected pistons moving in the cylinder, a piston-rod extending through the said stuffing-box and connected with one of the pistons, a supply-pipe G connected with and supplying air or gas to the opposite ends of the cylinder through said inlet valves and cooling chamber, and an outlet-pipe H leading from the cylinder and communicating therewith between the said connected pistons, substantially as described.

3. The combination in an air or gas compressor, of a cylinder A having inlet valves $e\ e'$ at opposite ends, a supply-pipe connected with said inlet valves, a pair of connected pistons, suitable means for varying the distance between said pistons, outlet valves 8 arranged in the pistons, and an outlet-pipe H leading from the cylinder between the pistons, substantially as described.

4. The combination in an air or gas compressor, of a cylinder A having inlet valves $e$ and $e'$ at its opposite ends, a supply-pipe G connected with said inlet valves, a pair of pistons arranged in the cylinder and one provided with a shank N having a socket 6 and the other with a stem 5 entering said socket and adjustable therein for varying the position of the two pistons relatively to each other, outlet valves 8 arranged in the pistons, and an outlet-pipe H leading from the cylinder between the pistons, substantially as described.

In testimony whereof I have hereunto set my hand.

CASPER W. MILES.

Witnesses:
T. SIMMONS,
O. KAISER.